United States Patent
Hauser et al.

(10) Patent No.: US 8,976,724 B2
(45) Date of Patent: Mar. 10, 2015

(54) METHOD AND SYSTEM FOR REPACKAGING WIRELESS DATA

(75) Inventors: Peter Edmund Heinrich Hauser, Kirkland, WA (US); Jason Edward Robert Hillyard, San Diego, CA (US)

(73) Assignee: Zomm, LLC, Tulsa, OK (US)

( * ) Notice: Subject to any disclaimer, the term of this patent is extended or adjusted under 35 U.S.C. 154(b) by 144 days.

(21) Appl. No.: 13/089,938

(22) Filed: Apr. 19, 2011

(65) Prior Publication Data

US 2011/0255454 A1 Oct. 20, 2011

Related U.S. Application Data

(60) Provisional application No. 61/326,068, filed on Apr. 20, 2010.

(51) Int. Cl.
| | |
|---|---|
| *H04B 7/14* | (2006.01) |
| *H04W 88/04* | (2009.01) |
| *H04W 76/04* | (2009.01) |

(Continued)

(52) U.S. Cl.
CPC ............ *H04W 88/04* (2013.01); *H04W 76/048* (2013.01); *H04W 84/18* (2013.01); *H04W 88/06* (2013.01)
USPC ........... 370/315; 370/279; 370/466; 370/467; 370/476

(58) Field of Classification Search
None
See application file for complete search history.

(56) References Cited

U.S. PATENT DOCUMENTS

| | | |
|---|---|---|
| 5,635,897 A | 6/1997 | Kuo |
| 5,796,338 A | 8/1998 | Mardirossian |
| 6,218,945 B1 | 4/2001 | Taylor, Jr. |

(Continued)

FOREIGN PATENT DOCUMENTS

| | | |
|---|---|---|
| BR | PI05011590 A | 9/2006 |
| DE | 202-7-9831 U1 | 12/2007 |

(Continued)

OTHER PUBLICATIONS

Deal Extreme, Bluetooth 2.0 External GPS Receiver (GBM 1 00), http://www.dealextreme.com/details.dx/sku.12350, (Accessed Jul. 16, 2009), 3 pages.

(Continued)

*Primary Examiner* — Kibrom T Hailu
*Assistant Examiner* — James P Duffy
(74) *Attorney, Agent, or Firm* — Holland & Knight LLP; Brian J. Colandreo, Esq.; Jeffrey T. Placker, Esq.

(57) ABSTRACT

The present disclosure may include a method for repackaging data in a communications system. The method may include receiving low-power RF data at a wireless relay device from one or more low power wireless devices and translating the low-power RF data at the wireless relay device into one or more translated packets. The method may further include synchronizing the translated low-power RF data with one or more wireless links and transmitting the synchronized low-power RF data to a host device. The method may further include receiving wireless communications from a host device, translating the parsing the wireless packets, synchronizing the translated packets with one or more low-power RF connections, and transmitting the synchronized packets to one ore more low-power RF devices. The method may further include managing the network topology of the communications system via commands to the wireless relay device.

21 Claims, 15 Drawing Sheets

(51) Int. Cl.
*H04W 84/18* (2009.01)
*H04W 88/06* (2009.01)

(56) References Cited

U.S. PATENT DOCUMENTS

| | | | |
|---|---|---|---|
| 6,265,974 B1 | 7/2001 | D'Angelo et al. | |
| 6,462,660 B1 | 10/2002 | Cannon et al. | |
| 6,472,986 B1 | 10/2002 | Sorriaux | |
| 6,563,427 B2 | 5/2003 | Bero et al. | |
| 6,836,212 B2 | 12/2004 | Sawinski | |
| 6,885,848 B2 | 4/2005 | Lee | |
| 6,915,216 B2 | 7/2005 | Troxler et al. | |
| 6,956,480 B2 | 10/2005 | Jespersen | |
| 6,967,576 B2 | 11/2005 | Hayes et al. | |
| 7,009,512 B2 | 3/2006 | Cordoba | |
| 7,015,817 B2 | 3/2006 | Copley et al. | |
| 7,054,594 B2 | 5/2006 | Bloch et al. | |
| 7,075,433 B2 | 7/2006 | Singer | |
| 7,091,863 B2 | 8/2006 | Ravet | |
| 7,095,748 B2 | 8/2006 | Vij et al. | |
| 7,110,777 B2 | 9/2006 | Duncan | |
| 7,248,840 B2 | 7/2007 | Chien | |
| 7,251,470 B2 | 7/2007 | Faucher et al. | |
| 7,257,374 B1 | 8/2007 | Creigh | |
| 7,259,671 B2 | 8/2007 | Ganley et al. | |
| 7,289,025 B2 | 10/2007 | Perez-Garcia et al. | |
| 7,333,776 B1 | 2/2008 | York | |
| 7,336,173 B1 | 2/2008 | Sandbrand | |
| 7,336,929 B2 | 2/2008 | Yasuda et al. | |
| 7,366,522 B2 | 4/2008 | Thomas | |
| 7,385,513 B2 | 6/2008 | Everest et al. | |
| 7,446,656 B2 | 11/2008 | Blakeway | |
| 7,518,514 B2 | 4/2009 | Bauchot et al. | |
| 7,535,357 B2 | 5/2009 | Enitan et al. | |
| 7,535,369 B2 | 5/2009 | Fong et al. | |
| 7,564,348 B2 | 7/2009 | Staton et al. | |
| 7,623,029 B2 | 11/2009 | Meyers | |
| 7,636,047 B1 | 12/2009 | Sempek | |
| 7,663,508 B2 | 2/2010 | Teshima et al. | |
| 7,696,923 B2 | 4/2010 | Houri | |
| 7,720,597 B2 | 5/2010 | Flick | |
| 7,772,849 B2 | 8/2010 | Zeller et al. | |
| 2002/0197989 A1* | 12/2002 | Cruder et al. | 455/426 |
| 2003/0083044 A1 | 5/2003 | Schreyer et al. | |
| 2003/0151506 A1 | 8/2003 | Luccketti | |
| 2003/0236890 A1* | 12/2003 | Hurwitz et al. | 709/227 |
| 2004/0021569 A1 | 2/2004 | Lepkofker et al. | |
| 2004/0097189 A1* | 5/2004 | Bongfeldt et al. | 455/7 |
| 2004/0143730 A1* | 7/2004 | Wen et al. | 713/150 |
| 2004/0183674 A1 | 9/2004 | Ruvarac | |
| 2004/0203570 A1 | 10/2004 | Berger | |
| 2005/0033515 A1 | 2/2005 | Bozzone | |
| 2005/0143152 A1 | 6/2005 | Yueh | |
| 2005/0200487 A1 | 9/2005 | O'Donnell et al. | |
| 2006/0050670 A1* | 3/2006 | Hillyard et al. | 370/338 |
| 2006/0105712 A1* | 5/2006 | Glass et al. | 455/41.2 |
| 2006/0238347 A1 | 10/2006 | Parkinson et al. | |
| 2007/0042714 A1 | 2/2007 | Ayed | |
| 2007/0082652 A1 | 4/2007 | Hartigan et al. | |
| 2007/0096897 A1 | 5/2007 | Weiner | |
| 2007/0109120 A1 | 5/2007 | Schaefer | |
| 2007/0258395 A1* | 11/2007 | Jollota et al. | 370/310 |
| 2007/0268878 A1* | 11/2007 | Clements | 370/338 |
| 2008/0020781 A1 | 1/2008 | Cho | |
| 2008/0175213 A1* | 7/2008 | Hansen | 370/338 |
| 2008/0182554 A1 | 7/2008 | Fan | |
| 2008/0214111 A1 | 9/2008 | Moshir et al. | |
| 2008/0214142 A1 | 9/2008 | Morin et al. | |
| 2009/0058670 A1 | 3/2009 | Sweeney et al. | |
| 2009/0061769 A1 | 3/2009 | Zimbric et al. | |
| 2009/0221320 A1 | 9/2009 | Walley et al. | |
| 2010/0035630 A1 | 2/2010 | Bosnjakovic et al. | |
| 2010/0039266 A1 | 2/2010 | Faris et al. | |
| 2010/0102993 A1 | 4/2010 | Johnson | |
| 2010/0216487 A1 | 8/2010 | Yamaguchi | |
| 2010/0271260 A1 | 10/2010 | Guo | |
| 2011/0021143 A1* | 1/2011 | Kapur et al. | 455/41.2 |

FOREIGN PATENT DOCUMENTS

| | | |
|---|---|---|
| EP | 1251472 A1 | 10/2002 |
| EP | 1924069 A1 | 5/2008 |
| FR | 2 769 738 | 4/1999 |
| GB | 2440630 A1 | 2/2008 |
| WO | 2006076785 A1 | 7/2006 |

OTHER PUBLICATIONS

Cleo Bluetooth Phone Guard, FAQ, User Manual, 5 pages.
Tenbu Technologies, nio—The First Line of Defense, Learn More, http://www.bluenio.com/learnmore.htm, (Accessed on Jul. 15, 2009), 2 pages.
Nio™—the first line of defence | Learn More, http://www.bluenio.com/learnmore.htm, "do you nio?" Jul. 15, 2009, pp. 1-2.
International Search Report and Written Opinion, mailed Jul. 5, 2011, in counterpart International Patent Application No. PCT/US2011/033014, 13 pgs.
International Preliminary Report on Patentability mailed Nov. 1, 2012 received in PCT/US2011/033014 (10 pgs.).
International Search Report and Written Opinion of the International Searching Authority mailed Oct. 28, 2010 received in PCT/US2010/044077 (11 pgs.).
International Preliminary Report on Patentability mailed Mar. 15, 2012 received in PCT/US2010/044077 (7 pgs.).

* cited by examiner

| HFP AG Event | ZOMM Protocol Application Value |
|---|---|
| +CIND Service | Telephony and Messaging: Network Available |
| Incoming Call | Telephony and Messaging: Incoming Call |
| Accept incoming call | Proximity: Soft Button |
| Reject Incoming call | Proximity: Soft Button |
| End Call | Proximity: Soft Button |
| +CIEV Battery Level Ind | Battery: Battery Level |
| New SMS | Telephony and Messaging: Message Alert |
| Dial Emergency Call | Telephony and Messaging: Emergency Call |

FIG. 13

| HFP Battery Level | ZOMM Protocol Battery Level (%) |
|---|---|
| 0 | 0-10 |
| 1 | 10-30 |
| 2 | 30-50 |
| 3 | 50-70 |
| 4 | 70-90 |
| 5 | 90-100 |

FIG. 14

METHOD AND SYSTEM FOR REPACKAGING WIRELESS DATA

RELATED APPLICATIONS

This application claims the benefit of U.S. provisional patent application Ser. No. 61/326,068, filed on 20 Apr. 2010, the entire disclosure of which is incorporated herein by reference.

FIELD OF THE INVENTION

This disclosure relates to the field of wireless devices and, more particularly, to communication between wireless devices and devices employing low energy wireless protocols.

BACKGROUND OF THE INVENTION

Standards such as the Bluetooth Wireless Technology and WiFi are often used to carry GSM data, sensor data, GPS data, etc.

All of these devices lack a few key elements such as:
a. The devices do not enable the accumulation of wireless data from one or more wireless devices that are connected to the device that then convey the data through a single Bluetooth wireless link to a paired and connected product.
b. The devices do not enable the synchronization of the wireless links so as to reduce power consumption. It should be noted that reducing power consumption may increase battery life.
c. They do not facilitate the abstraction of the third-party wireless standards so as to provide an extension of existing Bluetooth profiles and protocols.
d. Wireless protocols have differing power, communication frequency, and timing requirements, and are generally not optimized for use with small battery-powered devices.

Furthermore, no designs currently exist that accumulate data from paired and connected Bluetooth Low Energy (or other low power standard such as ANT and IEEE 802.15.4 (ZigBee)) wireless technology devices into a single standardized Bluetooth wireless technology pipe for use with existing Bluetooth wireless technology products.

BRIEF SUMMARY OF THE INVENTION

Embodiments of the present disclosure may include a method for repackaging data in a communications system. The method may include receiving low-power RF data at a wireless relay device from one or more low power wireless devices and translating the low-power RF data at the wireless relay device into one or more translated packets. The method may further include accumulating translated packets, synchronizing the translated low-power RF data with one or more wireless links and transmitting the synchronized low-power RF data to a host device.

Embodiments of the present disclosure may include a communications system comprising one or more low energy devices, a host device; and a wireless relay device configured to receive low power RF data from the one or more low energy devices, the wireless relay device further configured to translate the low-power RF data at the wireless relay device into one or more translated packets, the wireless relay device further configured to accumulate translated packets, synchronize the translated low-power RF data with one or more wireless links, and the wireless relay device further configured to transmit the synchronized low-power RF data to a host device.

Embodiments of the present disclosure may include a method for parsing data in a communications system. The method may include receiving encapsulated low power RF data within one or more wireless protocol packets and translating the low-power RF data at a wireless relay device into one or more translated packets. The method may further include accumulating translated packets, synchronizing the translated low-power RF data with one or more wireless links and transmitting the synchronized low-power RF data to a low-power RF device.

Embodiments of the present disclosure may include a method for parsing data in a communications system. The method may include receiving data on a relay device from a host device and repackaging the data in the communications system. The method may further include accumulating translated packets, synchronizing the data with one or more low-power RF connections and sending the data to one or more low-power RF devices. The method may also include managing a network topology of the communications system by dynamically adding or removing network devices using one or more commands sent to the wireless relay device from the host device.

Embodiments of the present disclosure may include a method for parsing data in a communications system. The method may include receiving standard commands within one or more wireless protocol packets at a relay device, acting on the commands directly on the relay device, and further translating the commands into low-power RF translated packets at the relay device. The method may further include synchronizing the translated low-power RF data with one or more wireless links and transmitting the synchronized low-power RF data to a low-power RF device so that they may be acted-on by the low-power RF device.

Embodiments of the present disclosure may include a method of managing low power RF connections within a communications system. The method may include receiving commands within one or more wireless protocol packets at a relay device, and parsing these commands locally on the relay device. The method may further include using these commands to manage connections between the relay device and other low power RF devices.

BRIEF DESCRIPTION OF THE SEVERAL VIEWS OF THE DRAWINGS

FIG. 13 is a diagram depicting a mapping between HFP events and proprietary protocol events in accordance with an embodiment of the present disclosure;

FIG. 14 is a diagram depicting a mapping between HFP battery events and proprietary protocol battery levels in accordance with an embodiment of the present disclosure.

DETAILED DESCRIPTION OF THE INVENTION

The present disclosure may, inter alia, allow new Bluetooth Low Energy wireless technology devices to be used with existing mobile phones, laptops, etc. that support Bluetooth wireless technology today. Embodiments of the present disclosure may utilize a wireless relay device to provide the full capability offered by the Bluetooth Low Energy technology to a device (e.g., a mobile phone) without the need for specialized Bluetooth Low Energy technology hardware.

Figure 1:
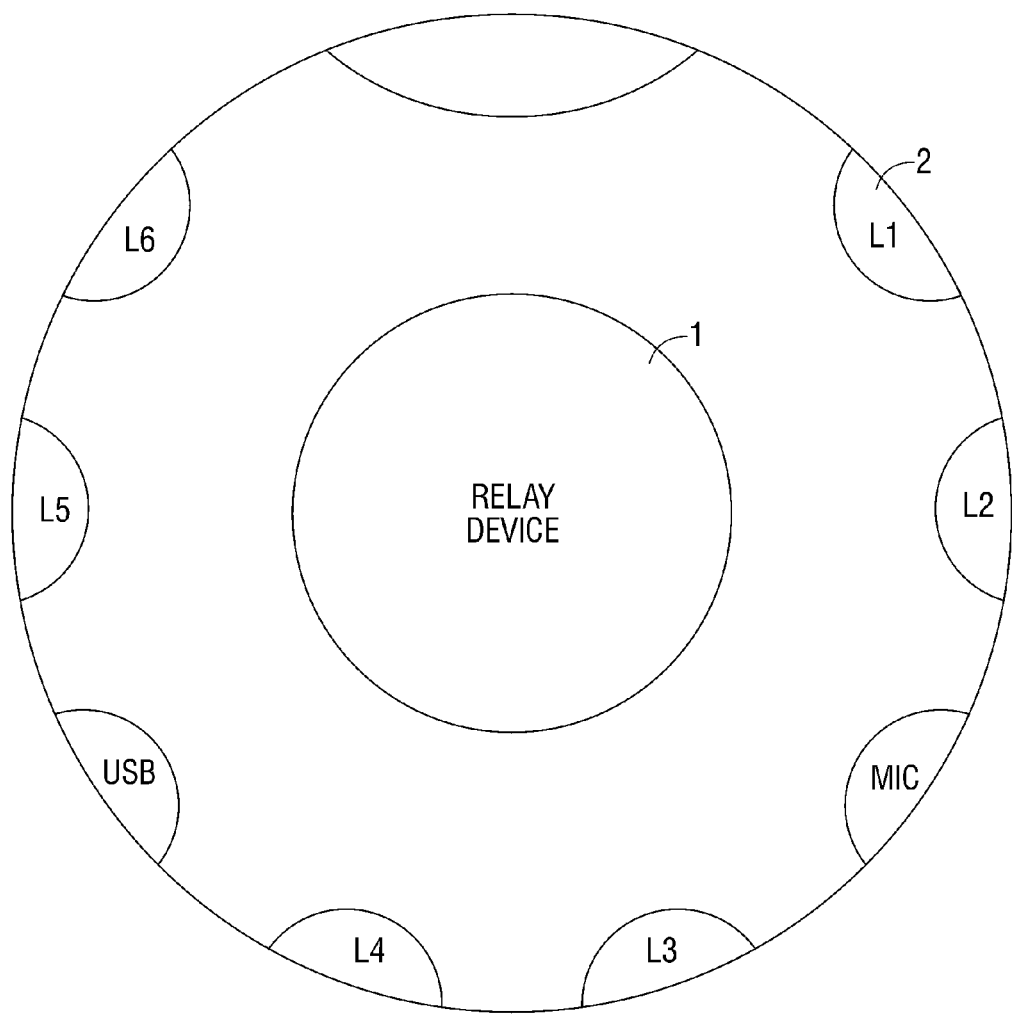
FIG. 1 is a depiction of a wireless relay device in accordance with an embodiment of the present disclosure.
Figure 2:
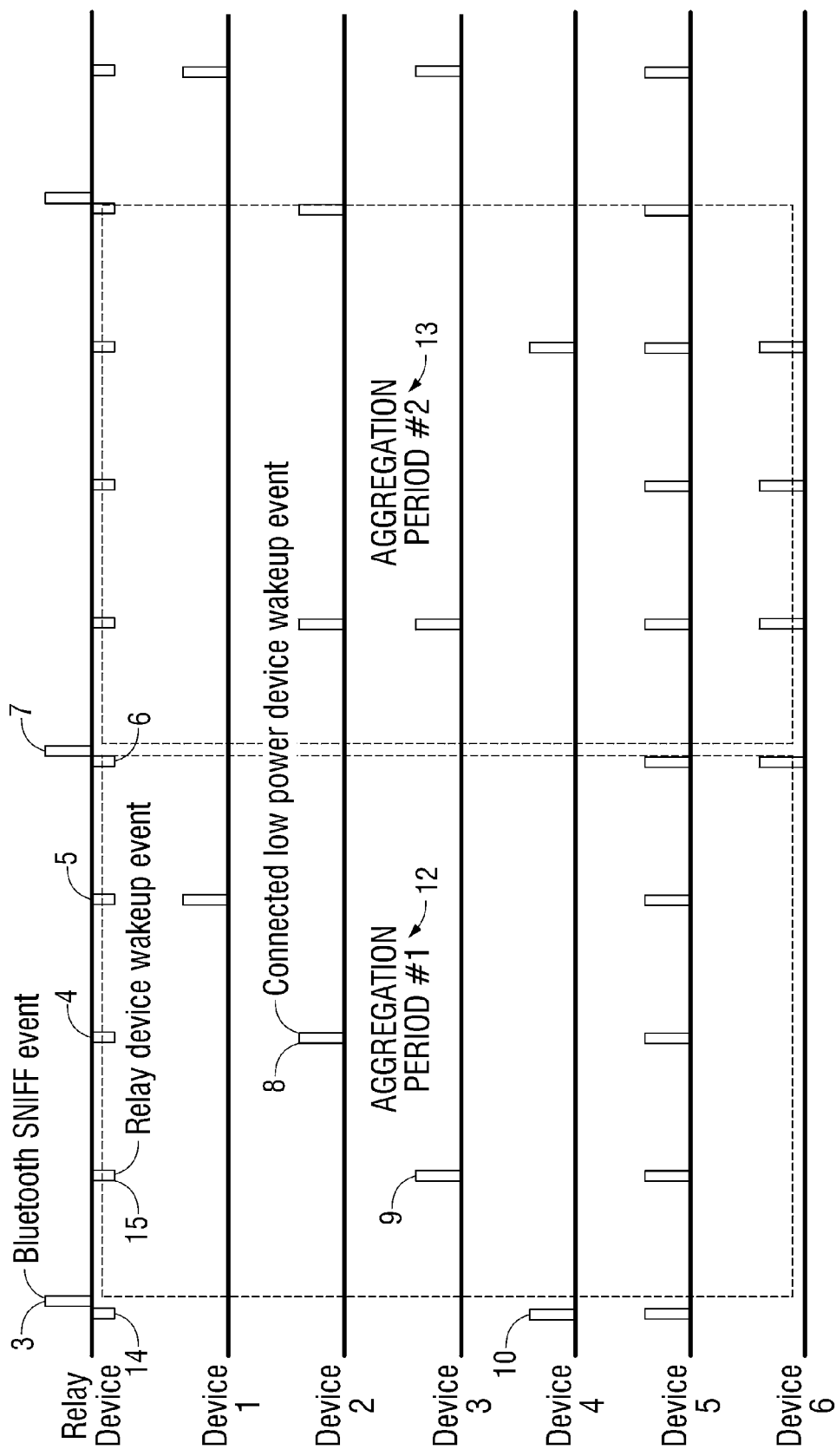
FIG. 2 is a diagrammatic view of a method of accumulating data from multiple low power wireless device sources in accordance with an embodiment of the present disclosure.
Figure 12:
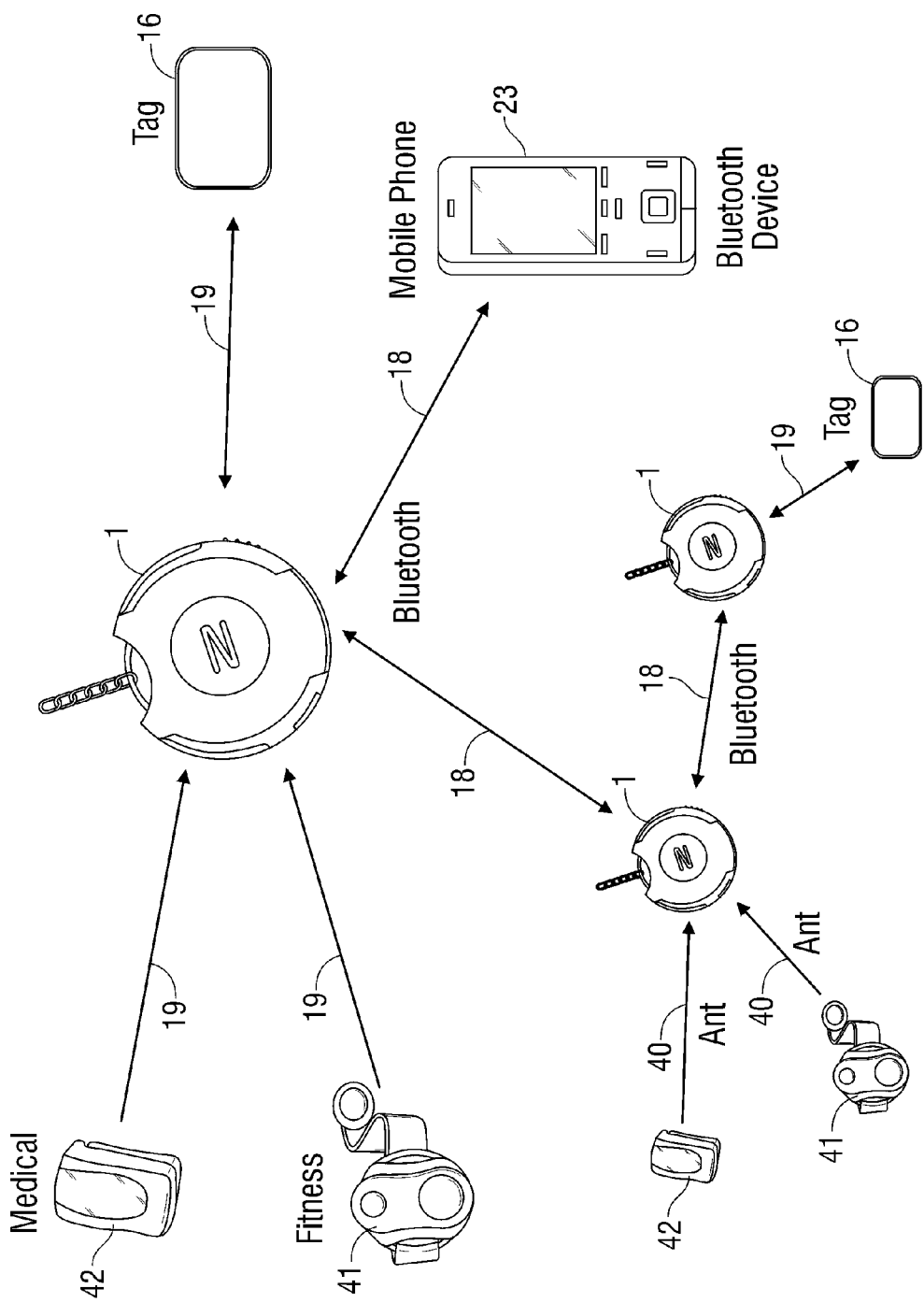
FIG. 12 is a diagram depicting one possible relay device ecosystem in accordance with an embodiment of the present disclosure.

Referring now to FIG. 1, a Bluetooth Low Energy Technology Relay Device 1 is provided. Wireless relay device 1 may extend the value of a device that supports Bluetooth technology to low power RF technologies such as Bluetooth Low Energy, ANT+, or IEEE 802.15.4 (ZigBee) (e.g. as shown in FIG. 12) without requiring said wireless device to support a low power RF technology. In some embodiments, this may occur by aggregating low power RF technology (e.g. Bluetooth Low Energy or ANT+) data, synchronizing the data with the Bluetooth wireless link as shown in FIG. 2, and sending the data to the existing Bluetooth wireless technology enabled host device (e.g. mobile phone).

Figure 3:
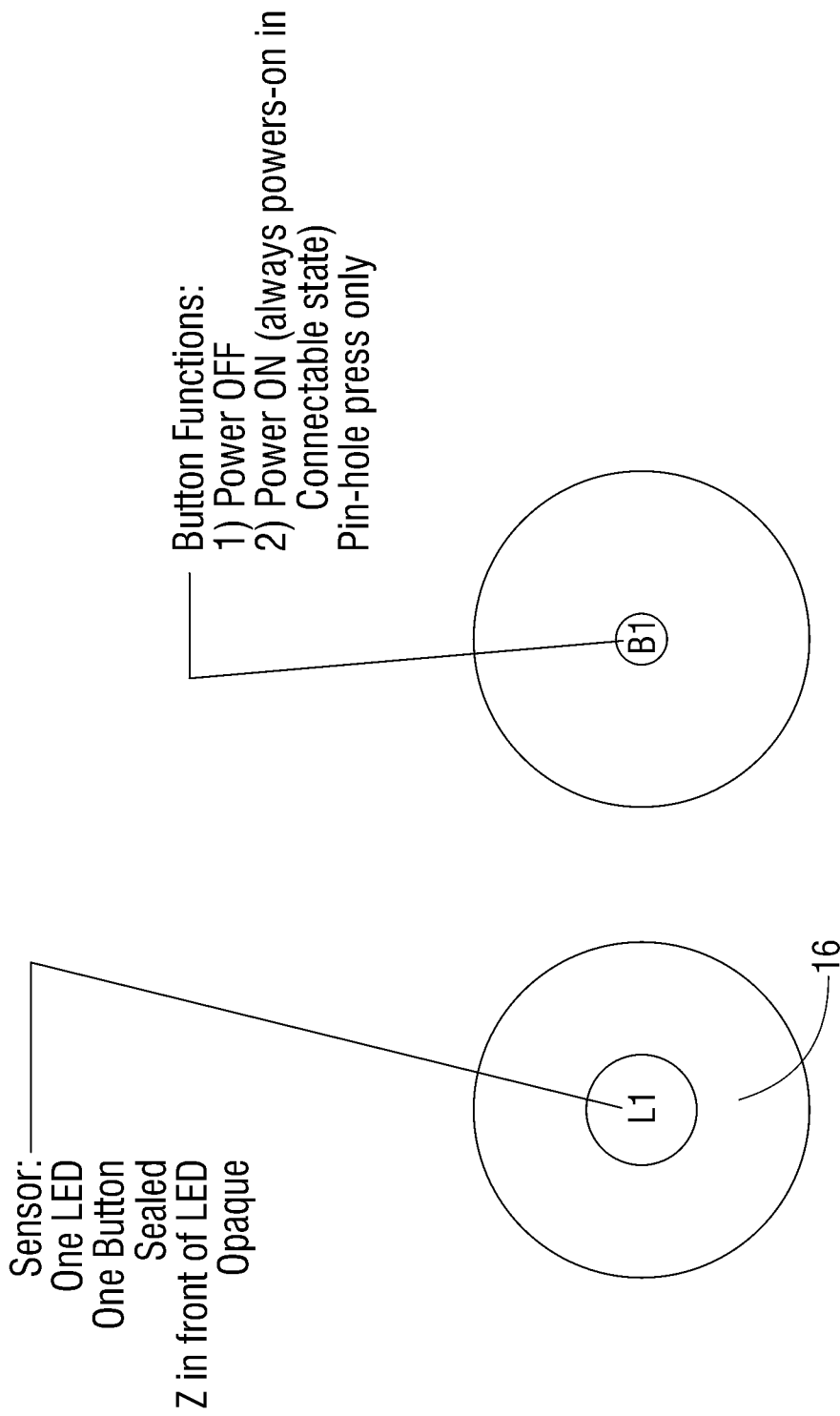
FIG. 3 is a depiction of a low power wireless sensor device in accordance with an embodiment of the present disclosure.
Figure 4:
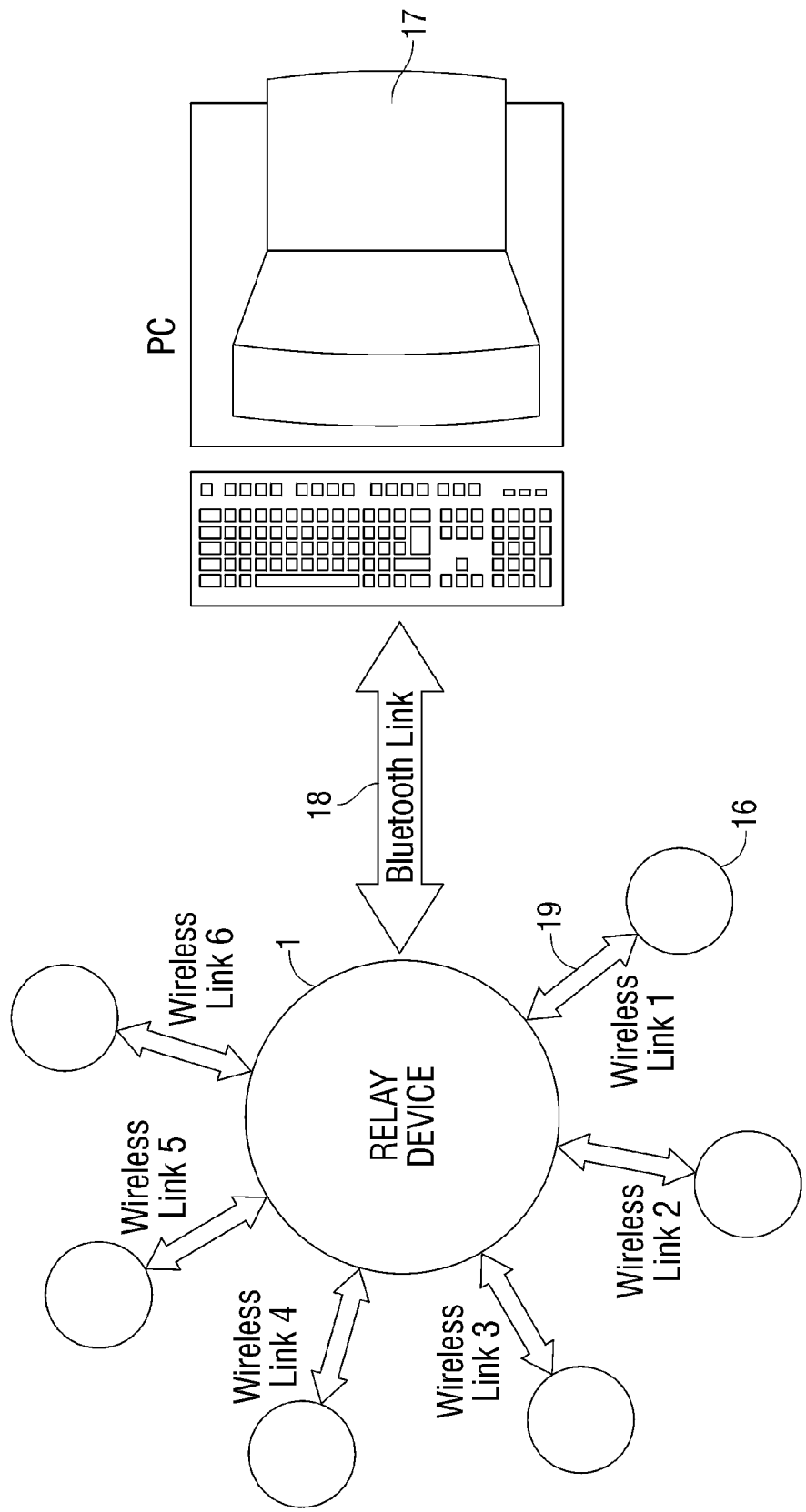
FIG. 4 is a depiction of one possible wireless relay device's network topology in accordance with an embodiment of the present disclosure.

In some embodiments, new low energy devices (e.g., 16, 41, 42) as shown in FIG. 3, FIG. 4, and FIG. 12 may be added to the wireless relay device 1 and the new data may be aggregated and provided to the Bluetooth wireless technology enabled host device until the maximum number of supported Bluetooth Low Energy wireless devices (e.g., 16, 41, 42) (or other third party technology device) is reached FIG. 4. In some embodiments, some host devices may include but are not limited to, mobile phones, personal computers, tablet PCs (e.g. iPads,), etc.

In some embodiments, if a Bluetooth Low Energy or other third party wireless technology device (e.g., 16, 41, 42) leave the wireless relay device's 1 device space, then the wireless relay device may inform the user by emitting a vibration, followed by a visual notification, and finally an alarm. The user may then silence the alarm/notification. Should the device reenter the wireless relay device's range of control, the alarm may cease and the user may be notified that the device has reentered the wireless relay device's personal device space.

In some embodiments, each low power RF device (e.g., 16, 41, 42) may be uniquely tracked by the wireless relay device 1 and may be given its own visual indicator 2 that provides feedback on the device's state within the wireless relay device's device network. This information may also be aggregated and sent to the paired and connected host device.

Figure 5:
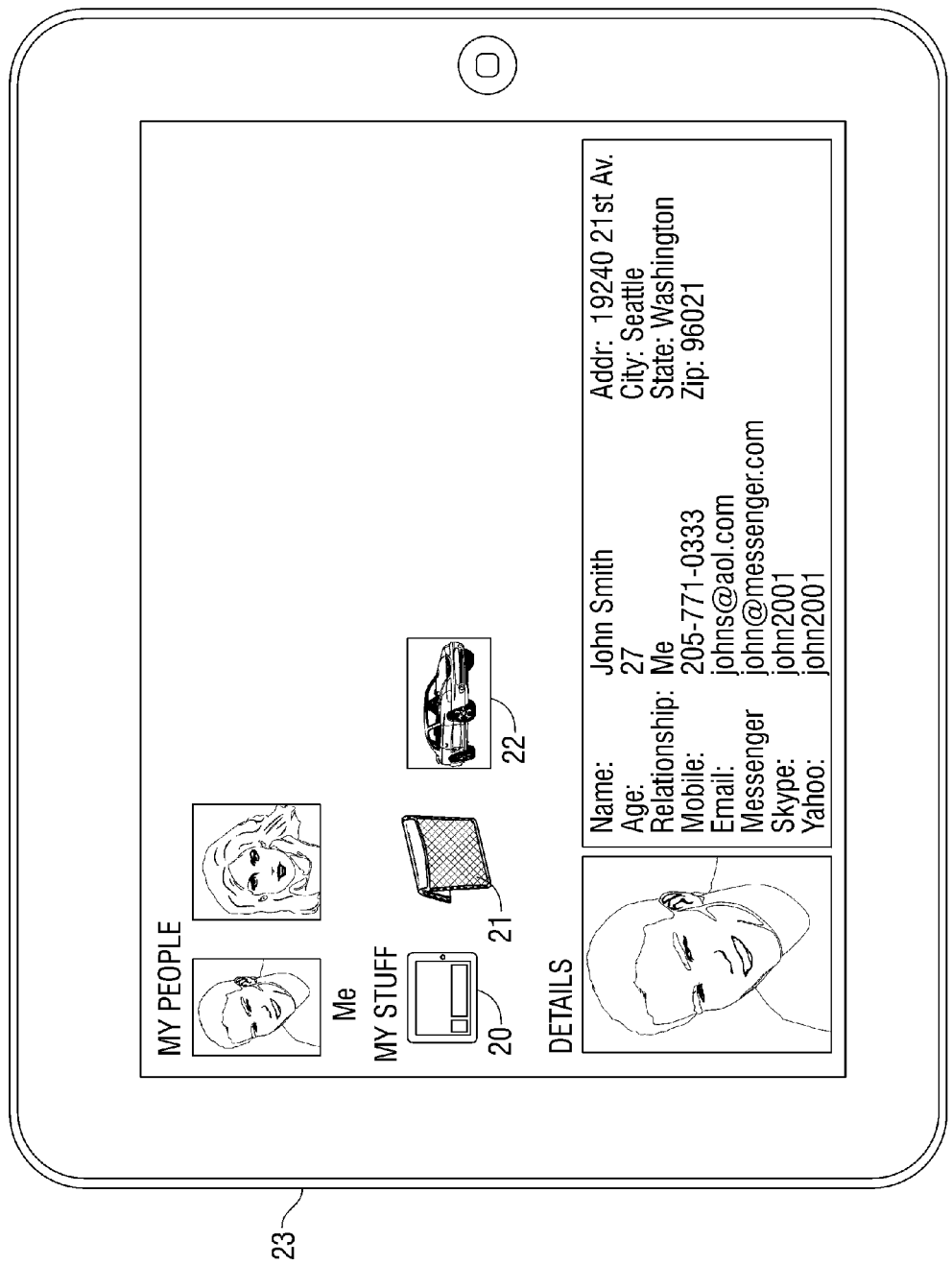
FIG. 5 is a depiction of low power devices as viewed on a mobile device in accordance with an embodiment of the present disclosure.
Figure 7:
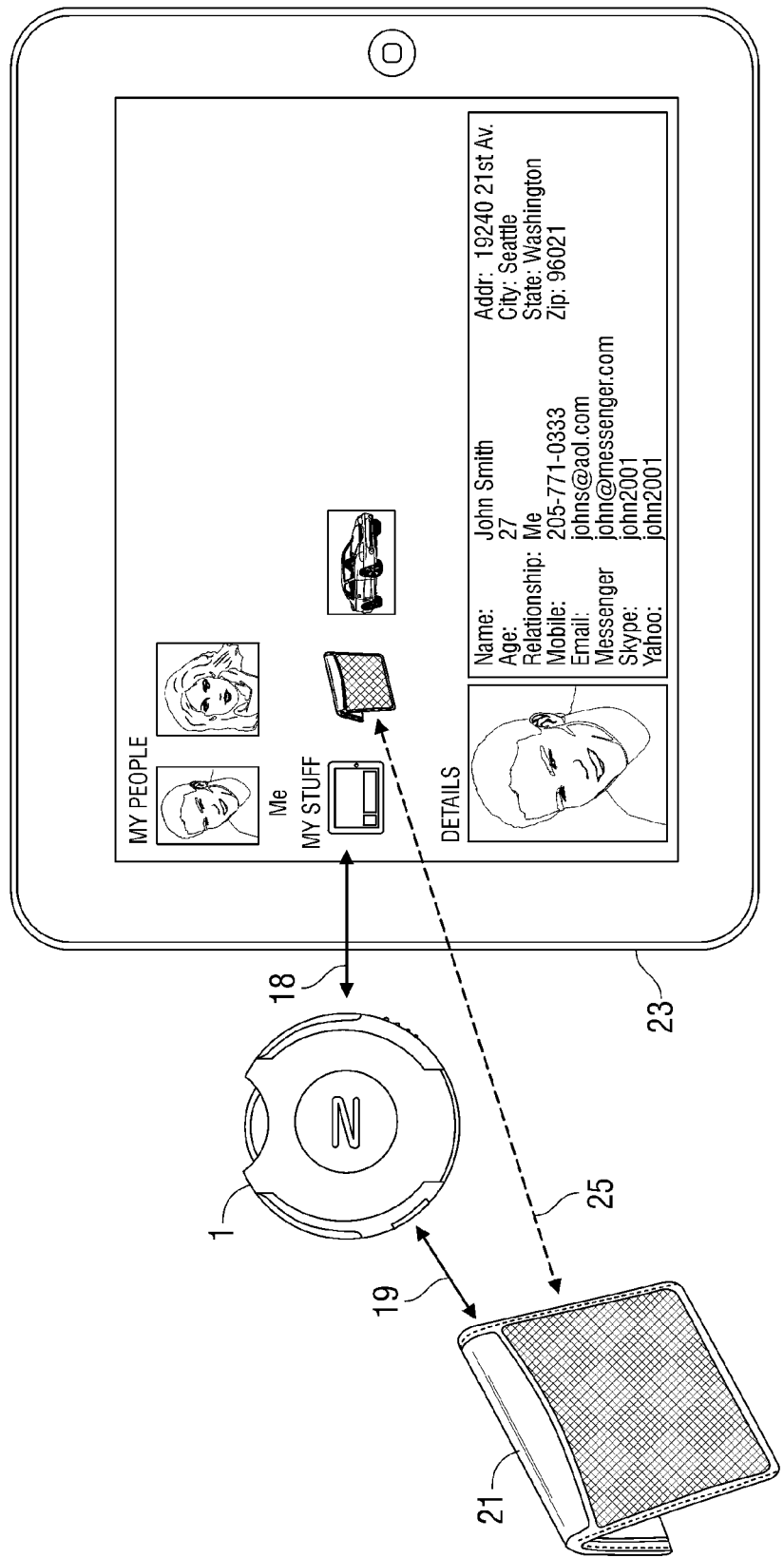
FIG. 7 is a depiction of how a customer might interact with his/her devices in accordance with an embodiment of the present disclosure.

In some embodiments, when acting as a wireless relay, the wireless relay device 1 may carry data to and from the low power RF devices (e.g., 16, 41, 42) to the paired and connected host device. In this manner, the host device may interact with the low power RF devices (e.g., 16, 41, 42) as though they were wirelessly connected directly to the host device 23 as shown in FIG. 5, FIG. 7, and FIG. 12. Similarly, the wireless relay device 1 may transfer data via a peer to peer Bluetooth or 802.11 (WiFi) connection to another wireless relay 1, which may then aggregate and translate the data and send it to the paired and connected host device 23. In this manner, the effective number of Bluetooth wireless devices 1 supported by the host device 23 may be extended.

In some embodiments, wireless relay device 1 as shown in FIG. 12 may enable standard Bluetooth wireless technology or WiFi equipped mobile phones to receive aggregated data from Bluetooth Low Energy and/or other low power wireless devices (e.g., 16, 41, 42). This may enable a standard mobile phone 23, for instance, that is equipped only with Bluetooth wireless technology to talk with devices, which may include but are not limited to, wireless pedometers 41, heart rate monitors 42, proximity sensors 16, etc.

In some embodiments, devices that can interoperate with the Bluetooth Low Energy technology standard 19, the ANT standard 40, and other low power wireless standards are all suitable for use with this invention. The data obtained from these devices (through standard interactions) may be translated into standard Bluetooth 18 or WiFi technology packets, and transferred to the Mobile Phone, PC, or other device 23. Special software may be used to decode this information and complete an action on the mobile phone or host PC.

Figure 6:
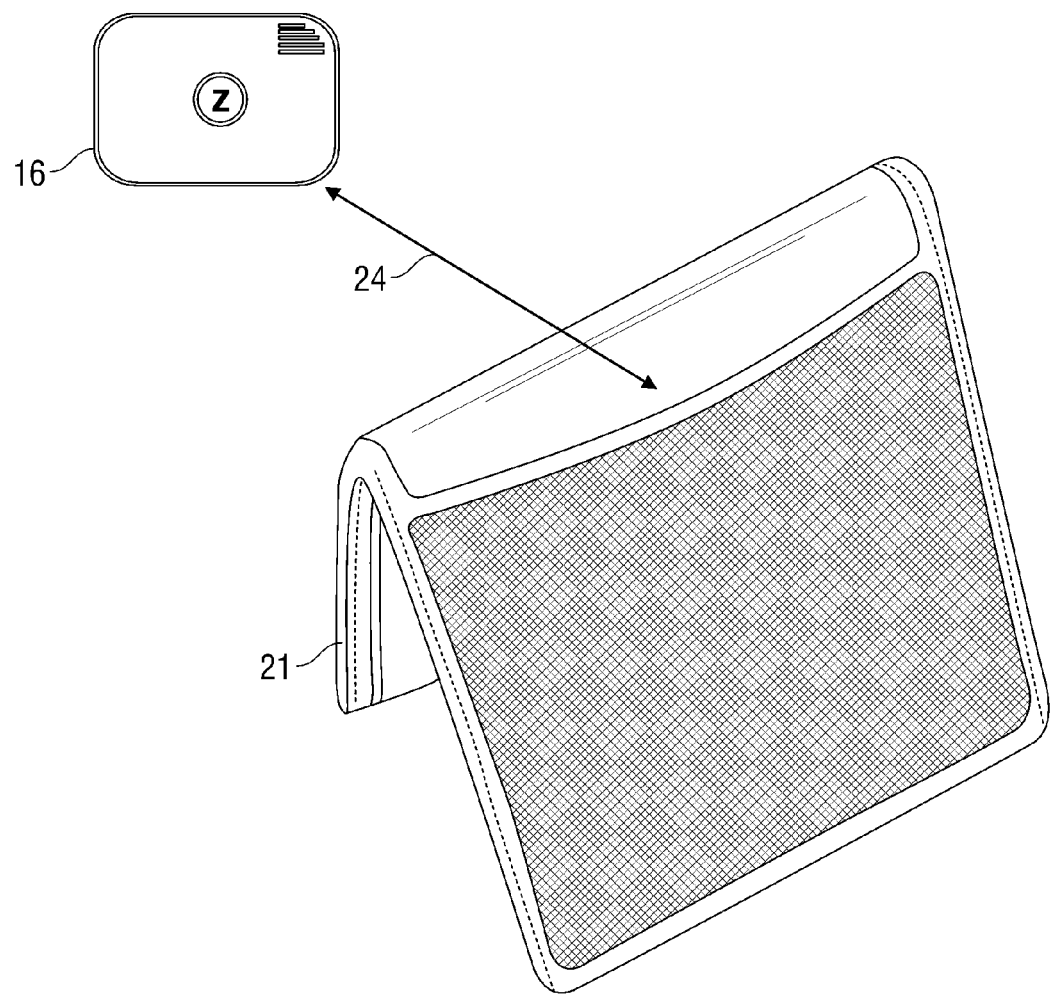
FIG. 6 is a depiction of a low power RF tag inserted into a wallet in accordance with an embodiment of the present disclosure.

In some embodiments, users can manage interactions between both the wireless relay device 1 and the connected low power wireless devices 16 that have been embedded into products 21 as shown in FIG. 6 and are represented in a Personal Device Network as shown in FIG. 7. Thus the wireless relay device's network topology may be dynamic and users can add, remove, and reset their networks easily. Because the wireless relay device network topology is also dynamic, users may be able to:

a. Add low power wireless devices to the wireless relay device network b. Remove low power wireless devices from the wireless relay device network c. Receive information from the low power wireless device on the PC or mobile phone via the wireless relay device 1.

d. Send information to the low power wireless device from the PC or mobile phone via the wireless relay device 1.

In some embodiments, wireless relay device 1 may provide the ability (e.g., with the help of an optional application 31) to:

a. Monitor an environment (tagged by GPS location)

b. Monitor vitals (tagged by GPS location)

c. Monitor an activity (tagged by GPS location)

In some embodiments, each paired and connected low power wireless device may report to the wireless relay device its information at regular intervals when connected as shown in FIG. 2. Wireless relay device 1 may then aggregate this information (e.g., 8-11) for one aggregation period 12 and report it to, for example, a mobile phone or a PC at the next available communication slot (e.g., every Bluetooth SNIFF interval) 7 as shown in FIG. 2.

In some embodiments, the wireless relay device 1 may function with or without a paired and connected host device. When not wirelessly connected to a host device, the wireless relay device may illuminate its LEDs 2 to notify the user that action may be required. For example, if one of the paired and connected low power RF devices exits the proximity of the wireless relay device.

In some embodiments, the wireless relay device 1 may be configured to store information from the host device 23 or from low power RF devices 16. In the event that the connection with the host device 23 is interrupted, the relay device 1 may store the aggregated information (e.g., 8-11) until the connection with the host device 23 is reestablished, before sending the aggregated information via the wireless link 18. Likewise, in the event that the connection with a low power RF device 16 is interrupted, the wireless relay device 1 may store aggregated information destined for the low power RF device 16 until the connection is reestablished.

In some embodiments, if paired with a wireless host device such as a mobile phone, the wireless relay device may, in addition to acting locally, send commands to the mobile phone that may trigger actions on the mobile phone, and/or receive commands from the mobile phone that trigger local actions or that may be passed to one or more of the paired and connected low power RF devices.

In some embodiments, some commands from the host device 23 may serve to manage connections between the relay device 1 and its paired low power RF devices 16. For example, a command from the host device 23 to the relay device 1 may put the relay device into a mode where it can pair with a new low power RF device 16. Once paired, the relay device 1 may inform the host device 23 of the new low power RF device 16 and may relay data between the low power RF device 16 and the host device 23 via the relay device 1.

In some embodiments, wireless relay device 1 may wakeup its low power radio module at every wakeup event e.g., 14, 15, 4, 5, and 6. During a wakeup event 14, the wireless relay device may communicate with one or more of the connected low power wireless devices and may send and/or receive the appropriate data to and from the connected low power device (e.g. 8-11). This process may repeat for several low power device communication cycles until a Bluetooth SNIFF interval or WiFi wake interval has been reached 7. At each such Bluetooth SNIFF or WiFi wake interval, wireless relay device 1 may send all of the aggregated data to the paired and connected host device, e.g., mobile phone or PC 3 and 7, and receives any information that is to be transferred to the connected low power wireless devices in the form of encapsulated packets.

In some embodiments, in order to conserve power, the communication intervals 14, 15, 4, 5, and 6 may be negotiated such that they may coincide with other activity on wireless relay device 1 and always slightly precede any Bluetooth wireless or WiFi communication with the paired and connected host device, e.g., mobile phone or PC 3 and 7. In this manner, wireless relay device 1 may aggregate sufficient information to send and receive to its connected low power devices without incurring additional latencies.

In some embodiments, for example, for devices that support Bluetooth v2.1+EDR and later Bluetooth standards, SNIFF subrating may be used to further reduce latencies. This may help to ensure that the maximal power saving benefits are enjoyed by negotiating the SNIFF subrating parameters and only responding at Bluetooth SNIFF intervals when data is available to send to the connected host device, (e.g., a mobile phone or PC).

In some embodiments, data from each of the connected low power wireless devices may be small and may be easily accumulated and encapsulated in the larger capacity Bluetooth and WiFi packets. Where additional packets are required to transfer the data, a long SNIFF timeout setting may be negotiated such that consecutive Bluetooth packets may be used to transfer the data.

In some embodiments, data encapsulation may take a format such as the following:

a. <device #><device type><data length><data>

In some embodiments, if Bluetooth technology is used, low power RF packets may be encapsulated into standard Bluetooth packets and transmitted using standard profiles such as the Bluetooth Hands-Free Profile (HFP) via proprietary AT commands, or the standard Bluetooth Human Interface Device (HID) profile data packets. Packets may also be encapsulated into proprietary protocol packets and transmitted using standard Bluetooth profiles or proprietary profiles such as the MFI profile over the Serial Port Protocol (SPP).

In some embodiments, consecutive packets may be strung or aggregated together until they fill a standard Bluetooth wireless packet. Wireless relay device 1 may choose not to decode the data, for example, rather it may transfer the data verbatim to enable rapid decoding by the connected host device, e.g., a mobile phone or PC. A software API on the mobile phone or PC may translate the packets received by the wireless relay device into a format that mimics that of the low power wireless devices that are connected to the wireless relay device. In this manner, the applications that utilize the APIs may do so in the same manner that they would if the data were available directly to them.

Referring to FIG. 7 and FIG. 12, wireless relay device 1 may act as a bridge between wireless devices. Wireless relay device 1 may, for example, aggregate information from low energy Bluetooth devices 16 and format the information so that it may be sent to a standard Bluetooth device 23. FIG. 2 shows a timetable of various data events on a wireless network. The horizontal axis of the timetable represents time. As shown, a relay device may from time to time send wake up signals (e.g. wake up signals 14, 15, 4-6) to various low energy Bluetooth devices (e.g. devices 1-6). In some embodiments, devices 1-6 may be in a sleep mode prior to receiving the wake up signal. After devices 1-6 receive the wake up signal they may return to a sleep mode. Additionally/alternatively, devices 1-6 may process and/or communicate over the wireless network after receiving the wake up signal from wireless relay device 1.

In some embodiments, devices 1-6 may wake at predetermined intervals and broadcast data. The relay device may in-turn listen at the predetermined intervals, and thereby receive the broadcast data, aggregate it, and send it to the standard Bluetooth device 23.

In some embodiments, wireless relay device 1 may send wake up signals to the various devices on a preset schedule. As shown, wireless relay device 1 may send wake up signal 14 to device 4 [10] and device 5 [11] and send wakeup signal [15] to device 3 [9] and device 5 [11]. When each device 1-6 receives the wake up signal, the device may wake up and process data. Upon waking up, the device may send information and/or data 8-11 over the wireless link to the wireless relay device 1. In turn, wireless relay device 1 may store and aggregate the data it receives from all devices 1-6, as described above, in order to send the aggregated data 7 to a standard Bluetooth device, as described above.

In some embodiments, wireless relay device 1 may send and/or receive Bluetooth packets at predetermined SNIFF events 3 and 7 to or from a standard Bluetooth device (e.g., a wireless telephone, a Bluetooth enabled computer, a Bluetooth enabled television, or any other type of Bluetooth enabled device employing any Bluetooth profile). During the time between SNIFF event 3 and SNIFF event 7, relay device may collect and aggregate all the data and information received from devices 1-6. When SNIFF event 7 occurs, wireless relay device 1 may send all the data aggregated during the time period between SNIFF event 3 and SNIFF event 7 to the standard Bluetooth device.

As discussed herein, an example of a wireless relay device 1 is shown in FIG. 1. The wireless relay device 1 may have various LEDs 2 that correspond to low power wireless devices that may be wirelessly connected to the wireless relay device 1. In one example, the L1 2 may turn on or off when wireless activity between wireless relay device 1 and the corresponding low power wireless device occurs. In some embodiments, an LED may be associated with a specific low power RF link.

Referring to FIG. 3 and FIG. 12, a wireless sensor device may be used to provide wireless relay device 1 with information such as temperature, walking pace 41, heart rate 42, and/or the distance between the sensor device 16 and the wireless relay device 1. By connecting one or more such wireless sensor devices to the wireless relay device, the wireless relay device may enable a mobile phone 23 or PC to act as though the sensor device were directly connected to it. While FIG. 3 depicts one example of a wireless sensor device 16, other configurations are within the scope of the invention.

In some embodiments, a low power RF wireless device 16 may be simple tags and consist of only a single button and LED. Such devices may be paired with the wireless relay device 1 then inserted into clothing, luggage tags, or other valuables. Once inserted, these low power RF wireless devices 16 may serve only to report their presence to the wireless relay device 1. Should one of these tags stop reporting, the wireless relay device 1 may vibrate, sound an alarm, flash a corresponding LED 2 and report the tag's absence to a paired and connected host device. In some instances, tags 16 may be more complex and serve to alert users in the event that they become separated from the paired and connected wireless relay device 1 by emitting a sound via a piezo buzzer, flashing lights, or vibrating. Other tags may serve additional purposes such as sensing temperature or vibration, and may relay this information back to the host device 23 via the wireless relay device 1.

FIG. 4 shows an example of a wireless relay device 1 connected to various other devices via a wireless network. As shown, the wireless relay device 1 is wirelessly connected to a host device such as a PC 17 via a wireless Bluetooth link 18. The wireless relay device is also shown wirelessly connected to devices 16 1-6 via low power wireless links 19. The wireless links 19 between the wireless relay device and devices 16 1-6 may be, for example, Bluetooth Low Energy wireless links.

In some embodiments, low power wireless tags 16 may be inserted 24 into any number of different products such as wallets 21 as shown in FIG. 6. When inserted into products, these wireless devices are uniquely identified and may be virtually associated with the product (e.g. 20-22) through an application 31 on the host device 23 as shown in FIG. 5 using their unique identifiers such as their Bluetooth Device Address (BDADDR). For example, as shown in FIG. 5, the wireless relay device 1 may be associated with the tablet icon 20, the wallet 21 may be associated with the wallet icon 21.

Figure 9:
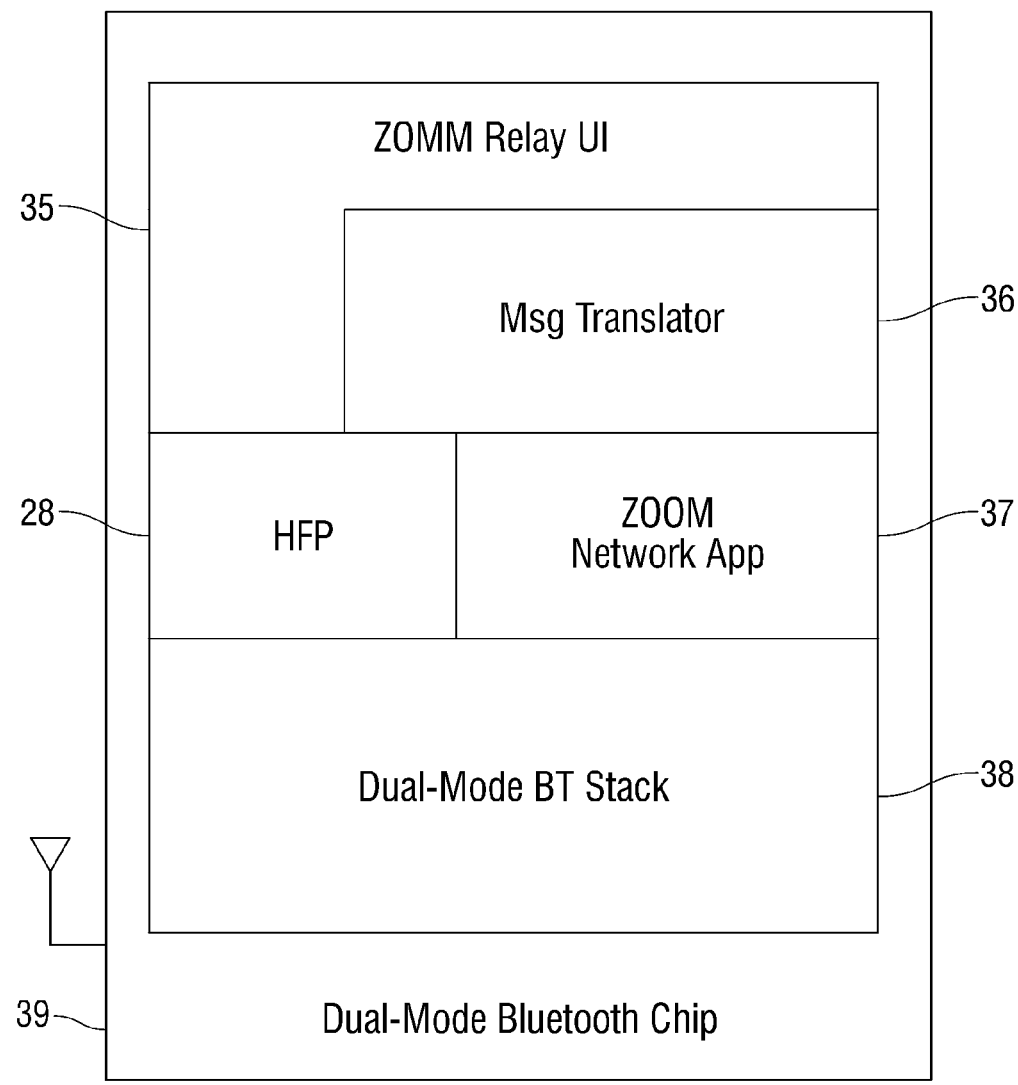
FIG. 9 is a diagram depicting another possible architecture in accordance with an embodiment of the present disclosure.
Figure 15:
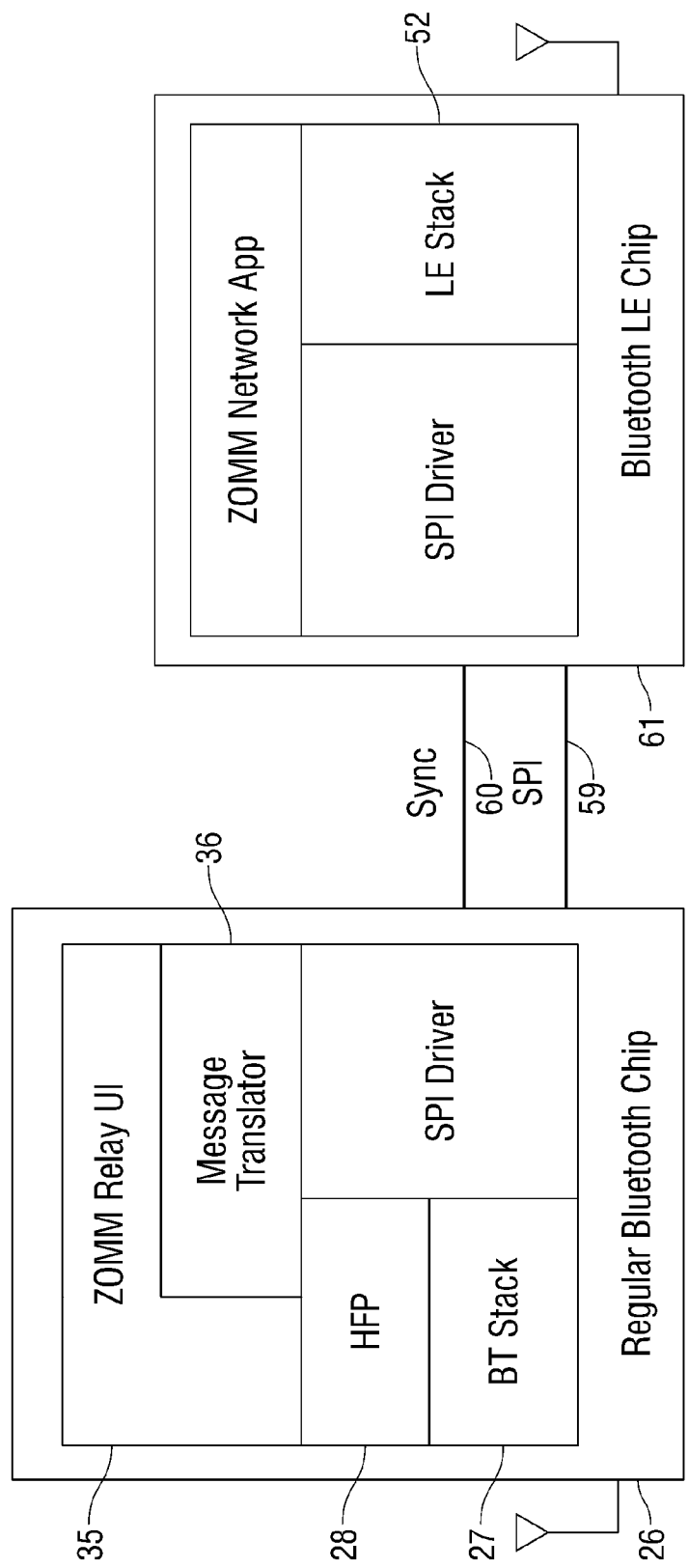
FIG. 15 is a diagram depicting one method for interconnecting Bluetooth and low power RF hardware to synchronize events in accordance with an embodiment of the present disclosure.

In some embodiments, wireless relay device 1 may be architected in a number of ways. One such architecture is depicted in FIG. 9, though other less integrated architectures may also be used as shown in FIG. 15. When architected as an integrated system, a single chip 39 may be used to control the wireless relay device 1. The basic relay application 32 infrastructure may consist of a UI 35, message translator 36, one or more Bluetooth profiles 28, a networking application 37, and a stack that supports one or more low-power wireless technologies.

Figure 8:
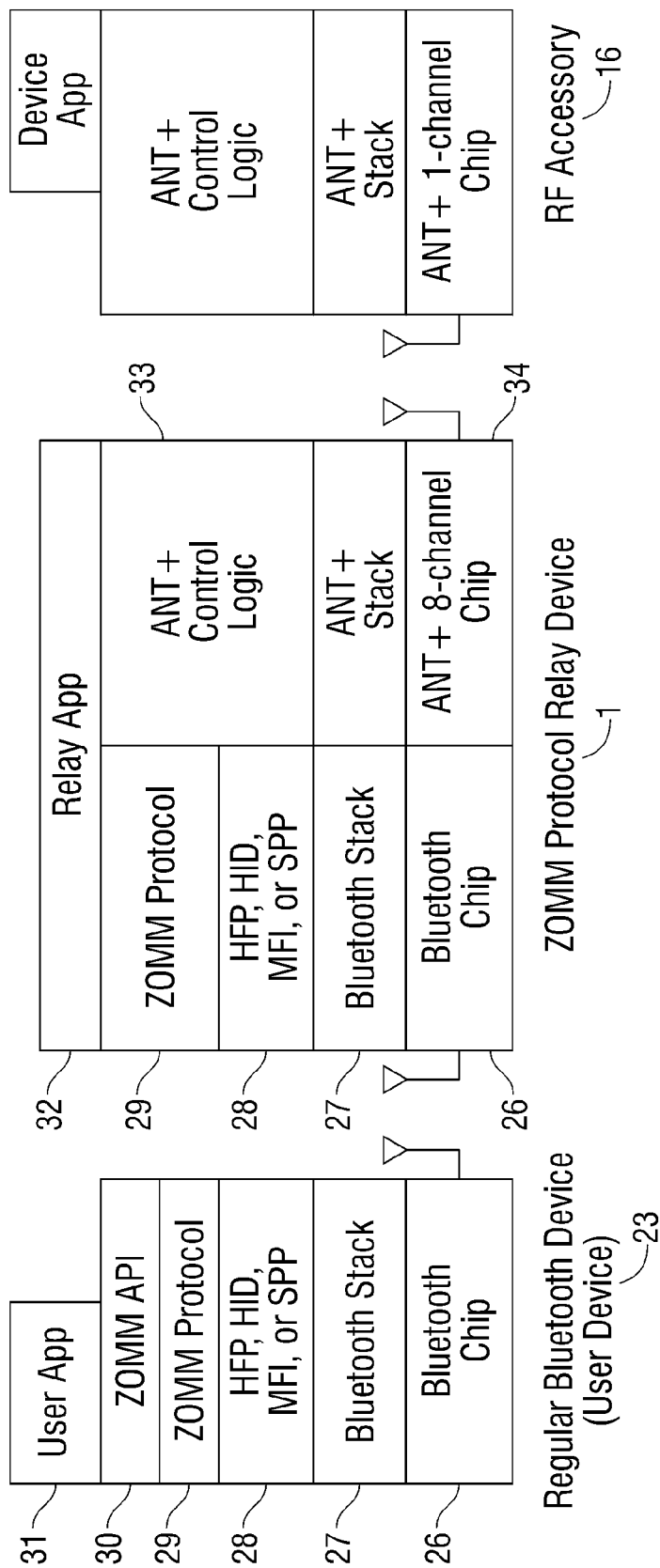
FIG. 8 is a diagram depicting one possible architecture in accordance with an embodiment of the present disclosure.

In some embodiments, when viewed as a logical system, the architecture may be viewed as is depicted in FIG. 7 and FIG. 8. The system may include a number of different components, e.g. host device 23 (Bluetooth, WiFi, etc.), wireless relay device 1, and low power RF device or accessory 21.

As shown in FIG. 7, an application running on the host device 23 then associates the low power RF device or accessory 21 virtually 25 though it is really connected via a low power RF link 19 to the wireless relay device 1 that is in-turn connected through a Bluetooth or WiFi link 18 to the host device 23.

In some embodiments, a Bluetooth host device 23 may contain a logical infrastructure that may include one or more components. Some components may include but are not limited to a user app 31 as also depicted as running on the host device 23 in FIG. 5, an application interface (API) 30, one or more proprietary protocols 29, one or more profiles such as HID, HFP, SPP, or MFI 28, a Bluetooth stack 27, and a Bluetooth chip 26.

In some embodiments, if a different wireless technology is used the profiles 28, stack 27 and chip 26 may need to be replaced by the appropriate lower layer infrastructure for the wireless technology in question.

In some embodiments, wireless relay device 1 may contain a logical infrastructure to support one or more low power RF technologies. In the case of a relay device that supports the ANT+ technology 40, the wireless relay device may consist of a wireless relay application 32 that controls both the Bluetooth wireless technology chip 26 and the ANT+ low power wireless RF chip 34. The actual implementation of the hardware may consist of a single chip solution as depicted in FIG. 9, or a multi-chip solution as depicted 26, 34 in FIG. 8.

In some embodiments, wireless relay device application may interact with proprietary protocol 29 and low power wireless control logic 33 to manage the two interdependent technologies in order to minimize the overall power consumption as described in FIG. 2.

In some embodiments, should a two-chip solution be used 1, then the Bluetooth chip 26 and low power RF chip 34 technology timing may be unaligned if left unmanaged. The timing between low power RF master chip 34 and one or more low power RF slave devices 16 may therefore be controlled in the low power RF master's control logic 33 using an interface to access the timing information on the regular Bluetooth chip 26 and an interface to control low power RF timing on the low power RF master chip 34.

In some embodiments, an alternative may be to leave Bluetooth SNIFF timing as unaligned but align the wired-interface communication between the regular Bluetooth chip 26 and low power RF master chip 34. When depicted as a two-chip solution as shown in FIG. 15 consisting of a regular Bluetooth technology chip 26 and a Bluetooth Low Energy Single-Mode Chip 61, the two chips may communicate with one another using a SPI interface 59 and may be synchronized using a sync line or bus connection 60. The Bluetooth technology chip 26 may thus align its sync line timing with the SNIFF interval, and thus communicate the timing to the Bluetooth Low Energy Single-Mode Chip 61. The Bluetooth Low Energy Single-Mode Chip 61 may then interpret this sync timing to align its communications with the paired and connected low power RF devices. In this manner, the chips may work independently, yet the timing may be optimized to reduce power consumption and to shorten latencies.

Figure 10:
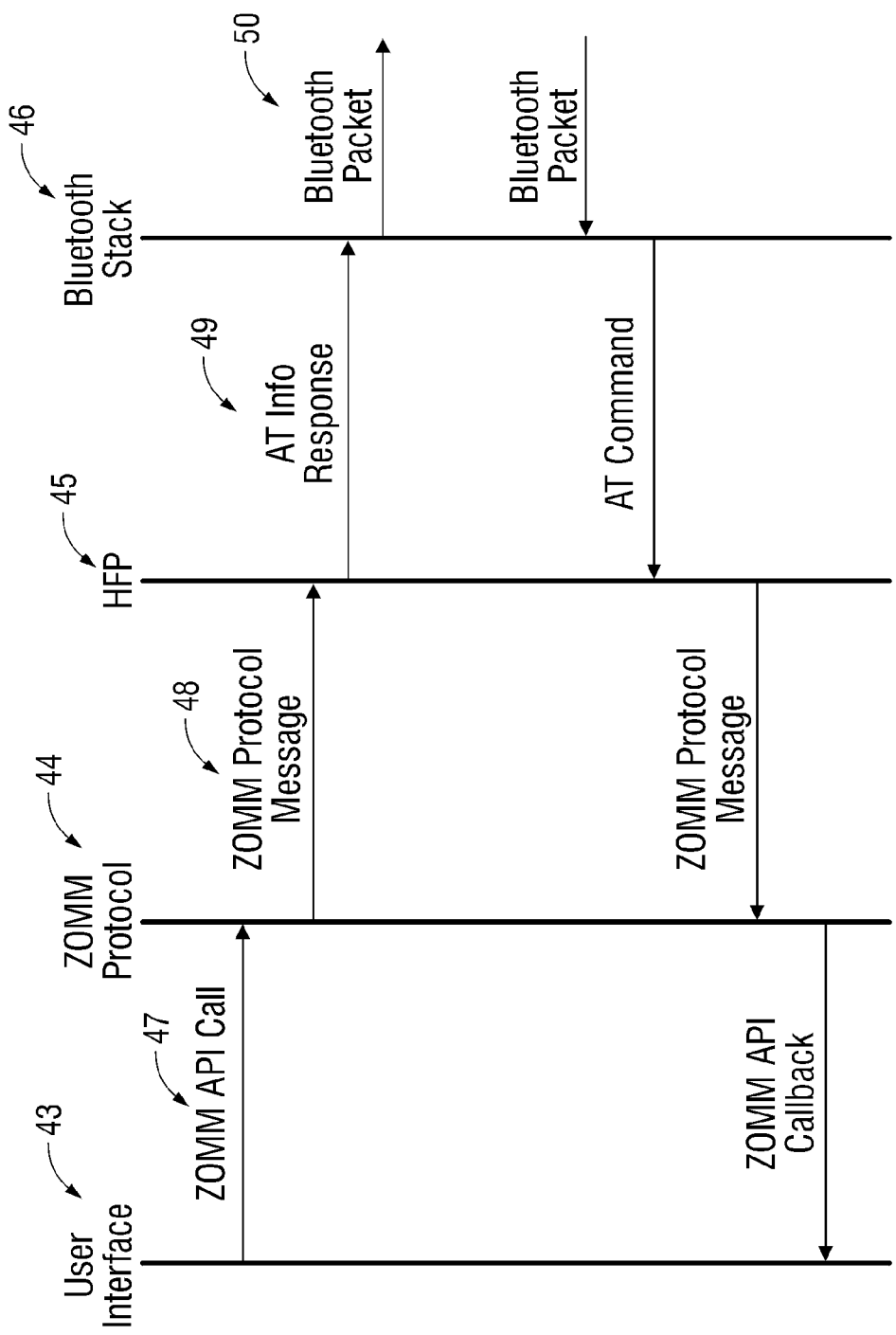
FIG. 10 is a diagram depicting the data flow on the phone application in accordance with an embodiment of the present disclosure.

In some embodiments, when viewing the message protocol taking-place on the Bluetooth host device such as a mobile phone as shown in FIG. 10, the protocol may be viewed logically as flowing from the user interface 43 through the proprietary protocol layer 44 to one or more Bluetooth profile layers 45 and ultimately through the host device's built-in Bluetooth stack 46 to the Bluetooth RF interface as a Bluetooth packet 50.

In some embodiments, the user action may trigger an API call 47 that may then trigger an internal protocol message 48 which may interact with the Bluetooth profile API 45 on the Bluetooth host device. If the Hands-Free Profile (HFP) is used, then the Bluetooth profile API 45 may trigger an AT command or AT info response 49 that then may get sent to the Bluetooth stack 46 and ultimately may reach the paired and connected relay device as a Bluetooth HFP protocol packet 50.

In some embodiments, once the wireless relay device may receive the Bluetooth HFP protocol packet [50], it may parse the packet and may relay the packet to the paired and connected low power RF device. In the case of a Bluetooth Low Energy device, the wireless relay device may respond as shown in FIG. 11.

Figure 11:
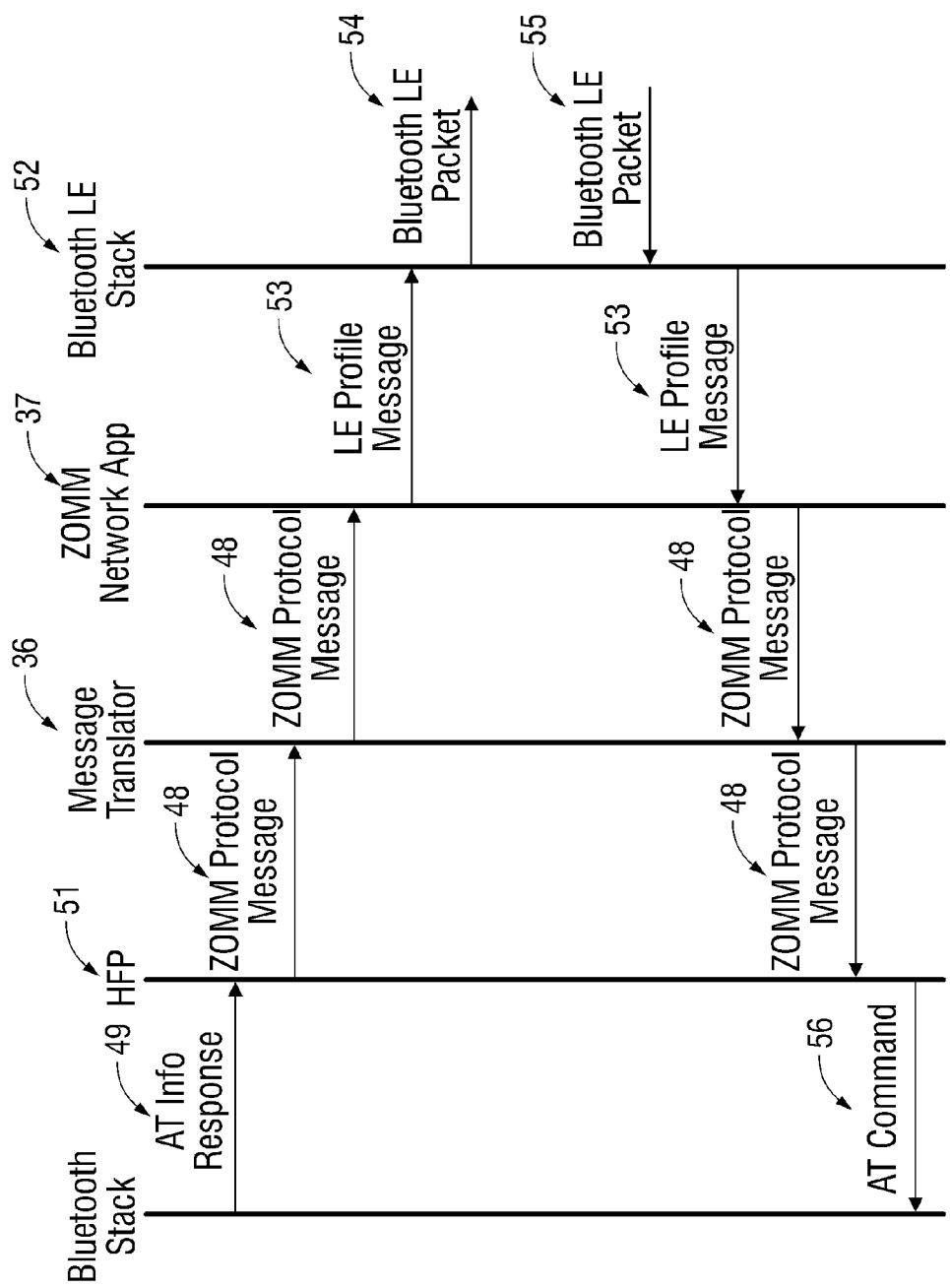
FIG. 11 is a diagram depicting the data flow on the wireless relay device in accordance with an embodiment of the present disclosure.

In the case of a Bluetooth Low Energy dual-mode solution as shown in FIG. 9 and represented as a logical flow diagram in FIG. 11, the wireless relay device may receive and parse the HFP-AT command 49 through its HFP profile 51 and prepare a proprietary protocol message 48 that may be passed-on to the paired and connected Bluetooth Low Energy accessory 16. This proprietary protocol message 48 may be created by the relay app 35 and passed-on to the message translator 36 that may then further parse the message and may pass the proprietary protocol message 48 to the network app 37. The network app may then parse the message and may translate it into a Bluetooth LE profile message 53 that may get passed to the dual-mode Bluetooth stack 38. The dual-mode Bluetooth stack 38 may then create a Bluetooth Low Energy packet 54 that may then ultimately get sent to the Bluetooth Low Energy accessory.

In some embodiments, should the Bluetooth Low Energy accessory respond, a similar process may be followed in reverse. The received message 55 may be parsed by the Bluetooth Low Energy stack 52 and passed-up as a Bluetooth Low Energy profile message 53 to the network app 37. The message translator 36 may then further parse the message and pass a proprietary protocol message 48 to the Bluetooth profile 51 by the relay app 32. This message may then be repackaged as an HFP-AT command 56 and sent via Bluetooth technology to the Bluetooth host device. In this manner, the integrity of the packet may always be maintained, and the Bluetooth host device application may believe that it is in-fact connected to a Bluetooth Low Energy accessory.

In some embodiments, in order to determine which protocol to use when communicating with the wireless relay device, the host device or relay device may attempt to communicate with each other using proprietary commands over a standard Bluetooth RF (e.g. Bluetooth HID or Bluetooth HFP) or WiFi interface. For example, upon establishing a Bluetooth HFP connection, the wireless relay device may attempt to send an AT+ZOMM? query to the host device to check if the host device supports the proprietary protocol. In receiving the AT+ZOMM? query, the host device may respond with a suitable AT+ZOMM response. This response may inform the wireless relay device that an application is present on the host device to support certain proprietary commands and/or proprietary protocols.

In some embodiments, if the proprietary protocol is supported, the wireless relay device may begin using the proprietary protocol. If not supported, then the wireless relay device may revert to the standard Bluetooth HFP protocol and instead use a mapping technique to map standard HFP commands to proprietary protocols. This may ensure backwards compatibility with host devices that may not support the proprietary protocols and also may enable proprietary behaviors to be emulated with Bluetooth host devices when no proprietary host application is present.

In some embodiments, when viewed at the protocol level, the wireless relay device may bridge the communication between a Bluetooth Hands-Free Profile host device and a Bluetooth Low Energy device using standard protocol such as Bluetooth HFP or HID. This may be accomplished by mapping HFP-AT and HID commands and responses directly to the Bluetooth Low Energy profile. The table 57 in FIG. 13 shows how such a mapping may be used.

Similarly, in some embodiments, standard HFP or HID commands may be mapped directly to proprietary protocol commands and used directly to manage certain behaviors on the wireless relay device, or on paired and connected low power RF accessories. This may be accomplished by mapping HFP information to proprietary protocols using a table 58 as shown in FIG. 14.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium (i.e. computer-readable storage device) would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium (i.e. computer-readable storage device) may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or) block diagrams, and combinations of blocks in the flowchart illustrations and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/pr block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The invention claimed is:

1. A method for relaying data in a communications system comprising:
    establishing a first wireless link over one of Bluetooth or 802.11 (WiFi) between a wireless relay device and a host device;
    transmitting a query by one of the host device and the wireless relay device and determining if one of the host device and the wireless relay device supports a particular protocol, based upon at least in part, on a received response to the query;
    establishing one or more low-power wireless links including at least one of a Bluetooth Low Energy wireless link, an ANT+wireless link, and an IEEE 802.15.4 (ZigBee) wireless link between the wireless relay device and one or more low-power wireless devices;
    receiving one or more low-power RF packets including one of Bluetooth Low Energy data, ANT+data and ZigBee data at a wireless relay device from the one or more low-power wireless devices;
    translating the data including at least one of Bluetooth Low Energy data, ANT+data and ZigBee data at the wireless relay device into one or more translated packets, wherein translating includes, at least in part, encapsulating data including at least one of Bluetooth Low Energy data, ANT+data and ZigBee data with at least one of one or more standard Bluetooth and WiFi packets, and wherein translating further includes parsing a command associated with the data including at least one of Bluetooth Low Energy data, ANT+data and ZigBee data, preparing a protocol message from the parsed command, parsing the protocol message at a translator application, and parsing the protocol message at a network application;
    synchronizing the translated data including at least one of Bluetooth Low Energy data, ANT+data and ZigBee data with the first wireless link; and
    transmitting the translated and synchronized data including at least one of Bluetooth Low Energy data, ANT+data and ZigBee data to the host device, wherein the translated and synchronized data including at least one of Bluetooth Low Energy data, ANT+data and ZigBee data is wirelessly transmitted during a plurality of communication intervals to the host device via the at least one of the one or more Bluetooth and WiFi packets over the first wireless link;
    wherein if the connection with the host device or the one or more low-power wireless devices is interrupted, aggregating and storing information from the host device or from the one or more low power wireless at the wireless relay device until the connection with the host device or one or more low-power wireless devices is reestablished.

2. The method of claim 1 wherein the host device includes at least one of a mobile phone, personal computing device, a television, and a tablet device.

3. The method of claim 1 wherein the one or more low-power wireless devices includes at least one of an RF tag, a wireless sensing device, a wireless fitness device, a medical sensor, and a proximity sensor.

4. The method of claim 1, wherein translating further includes, at least in part, at least one of Bluetooth Hands-Free Profile (HFP), Bluetooth Human Interface Device (HID) profile, MFI protocol and Serial Port Protocol (SPP).

5. The method of claim 1 wherein the host device includes one or more applications configured to present some or all of the Bluetooth Low Energy data from the one or more low-power wireless devices.

6. The method of claim 1 further comprising negotiating the plurality of communication intervals at the wireless relay device.

7. The method of claim 6 wherein negotiating incorporates, at least in part, one or more sniff parameters.

8. The method of claim 6 wherein the plurality of communication intervals are negotiated such that the plurality of communication intervals coincide with at least one other activity on the wireless relay device and precedes communication with at least one of the one or more low-power wireless devices and the host device.

9. The method of claim 1 further comprising generating an activation event using at least one of the host device, the wireless relay device, and the one or more low-power wireless devices.

10. The method of claim 1 wherein the wireless relay device further include an LED configured for association with a specific low-power RF link of the one or more wireless links.

11. The method of claim 1 further comprising receiving a command from the host device at the relay device to manage one or more connections between the wireless relay device and the one or more low-power wireless devices.

12. The method of claim 11 wherein the command includes an instruction for the wireless relay device to pair with the one or more low-power wireless devices.

13. A communications system comprising:
one or more low power wireless devices;
a host device; and
a wireless relay device, wherein at least one of the host device and the wireless relay device is configured to establish a first wireless link over one of Bluetooth or 802.11 (WiFi) between the wireless relay device and the host device, transmit a query, wherein at least one of the host device and the wireless relay device is further configured to determine if one of the host device and the wireless relay device supports a particular protocol, based upon at least in part, on a received response to the query, establish one or more low-power wireless links including at least one of a Bluetooth Low Energy wireless link, an ANT+wireless link, and an IEEE 802.15.4 (ZigBee) wireless link between the wireless relay device and one or more low-power wireless devices, the wireless relay device further configured to receive one or more low-power RF packets including one of Bluetooth Low Energy data, ANT+data and ZigBee data from the one or more low power wireless devices, the wireless relay device further configured to translate data including at least one of Bluetooth Low Energy data, ANT+data and ZigBee data at the wireless relay device into one or more translated packets, wherein translating includes, at least in part, encapsulating data including at least one of Bluetooth Low Energy data, ANT+data and ZigBee data with at least one of one or more standard Bluetooth and WiFi packets, and wherein translating further includes parsing a command associated with the data including at least one of Bluetooth Low Energy data, ANT+data and ZigBee data, preparing a protocol message from the parsed command, parsing the protocol message at a translator application, and parsing the protocol message at a network application, the wireless relay device further configured to synchronize the translated data including at least one of Bluetooth Low Energy data, ANT+data and ZigBee data with one or more wireless links, the wireless relay device further configured to transmit the translated and synchronized data including at least one of Bluetooth Low Energy data, ANT+data and ZigBee data to a host device, wherein the translated and synchronized data including at least one of Bluetooth Low Energy data and ZigBee data, when transmitted to the host device, is wirelessly transmitted during a plurality of communication intervals to the host device via the at least one of the one or more Bluetooth and WiFi packets, wherein if the connection with the host device or the one or more low-power wireless devices is interrupted, at least one of the host device and the wireless relay device is further configured to aggregate and store information from the host device or from the one or more low power wireless at the wireless relay device until the connection with the host device or one or more low-power wireless devices is reestablished.

14. The system of claim 13 wherein the host device includes at least one of a mobile phone, personal computer, a television and a tablet device.

15. The system of claim 13 wherein the one or more low power wireless devices includes at least one of an RF tag, a wireless sensing device, a wireless fitness device, a medical sensor, and a proximity sensor.

16. The system of claim 13, wherein translating includes, at least in part, at least one of Bluetooth Hands-Free Profile (HFP), Bluetooth Human Interface Device (HID), and MFI protocol, and Serial Port Protocol (SPP).

17. The system of claim 13 wherein the host device includes one or more applications configured to present at least a portion of the Bluetooth Low Energy data from the one or more low energy devices.

18. The system of claim 13 wherein the wireless relay device is further configured to negotiate a plurality of communication intervals.

19. The system of claim 18 wherein negotiating incorporates, at least in part, one or more sniff parameters.

20. The system of claim 13 wherein at least one of the host device, the wireless relay device, and the one or more low-power wireless devices is further configured to generate an activation event.

21. A method for relaying data in a communications system comprising:
establishing a first wireless link over one of Bluetooth or 802.11 (WiFi) between a wireless relay device and a host device;
transmitting a query by one of the host device and the wireless relay device and determining if one of the host device and the wireless relay device supports a particular protocol, based upon at least in part, on a received response to the query;
establishing one or more low-power wireless links including at least one of a Bluetooth Low Energy wireless link, an ANT+wireless link, and an IEEE 802.15.4 (ZigBee) wireless link between the wireless relay device and one or more low-power wireless devices;
receiving one or more low-power RF packets including one of Bluetooth Low Energy data, ANT+data and ZigBee data at a wireless relay device from the one or more low-power wireless devices;
translating the data including at least one of Bluetooth Low Energy data, ANT+data and ZigBee data at the wireless relay device into one or more translated packets, wherein translating includes, at least in part, encapsulating data including at least one of Bluetooth Low Energy data, ANT+data and ZigBee data with at least one of one or more standard Bluetooth and WiFi packets, and wherein translating further includes parsing a command associated with the data including at least one of Bluetooth Low Energy data, ANT+data and ZigBee data, preparing a protocol message from the parsed command, parsing the protocol message at a translator application, and parsing the protocol message at a network application;

synchronizing the translated data including at least one of Bluetooth Low Energy data, ANT+data and ZigBee data with the first wireless link;

transmitting the translated and synchronized data including at least one of Bluetooth Low Energy data, ANT+data and ZigBee data to the host device, wherein the translated and synchronized data including at least one of Bluetooth Low Energy data, ANT+data and ZigBee data is wirelessly transmitted during a plurality of communication intervals to the host device via the at least one of the one or more Bluetooth and WiFi packets over the first wireless link;

wherein if the connection with the host device or the one or more low-power wireless devices is interrupted, aggregating and storing information from the host device or from the one or more low power wireless at the wireless relay device until the connection with the host device or one or more low-power wireless devices is reestablished; and managing a network topology of the communications system by at least one of dynamically adding and removing at least one of the one or more low-power wireless devices using one or more commands sent to the wireless relay device from the host device.

* * * * *